United States Patent
Golyatin et al.

(10) Patent No.: US 11,123,959 B2
(45) Date of Patent: Sep. 21, 2021

(54) GLASS ARTICLE WITH DETERMINED STRESS PROFILE AND METHOD OF PRODUCING THE SAME

(71) Applicant: CORNING INCORPORATED, Corning, NY (US)

(72) Inventors: Vladislav Yuryevich Golyatin, Avon (FR); Jason Thomas Harris, Horseheads, NY (US); Guangli Hu, Berkeley Heights, NJ (US); Butchi Reddy Vaddi, Painted Post, NY (US); Natesan Venkataraman, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 433 days.

(21) Appl. No.: 15/516,961

(22) PCT Filed: Oct. 7, 2015

(86) PCT No.: PCT/US2015/054348
§ 371 (c)(1),
(2) Date: Apr. 5, 2017

(87) PCT Pub. No.: WO2016/057590
PCT Pub. Date: Apr. 14, 2016

(65) Prior Publication Data
US 2017/0297308 A1    Oct. 19, 2017

Related U.S. Application Data

(60) Provisional application No. 62/060,941, filed on Oct. 7, 2014.

(51) Int. Cl.
*B32B 17/06* (2006.01)
*C03C 21/00* (2006.01)
(Continued)

(52) U.S. Cl.
CPC .............. *B32B 17/06* (2013.01); *C03B 17/02* (2013.01); *C03B 17/064* (2013.01); *C03C 17/02* (2013.01);
(Continued)

(58) Field of Classification Search
None
See application file for complete search history.

(56) References Cited

U.S. PATENT DOCUMENTS

| 3,533,888 A | 10/1970 | Eppler et al. |
| 3,582,454 A | 6/1971 | Giffen |

(Continued)

FOREIGN PATENT DOCUMENTS

| CN | 101764467 B | 4/2012 |
| CN | 102791646 A | 11/2012 |

(Continued)

OTHER PUBLICATIONS

Translation of Omori et al. TW201326060 (Year: 2013).*

(Continued)

*Primary Examiner* — David Sample

(57) ABSTRACT

A laminated glass article includes a core layer and a clad layer directly adjacent to the core layer. The core layer is formed from a core glass composition. The clad layer is formed from a clad glass composition. An average clad coefficient of thermal expansion (CTE) is less than an average core CTE such that the clad layer is in compression and the core layer is in tension. A compressive stress of the clad layer decreases with increasing distance from an outer surface of the clad layer within an outer portion of the clad layer and remains substantially constant with increasing distance from the outer surface of the clad layer within an intermediate portion of the clad layer disposed between the outer portion and the core layer. A thickness of the inter- (Continued)

mediate portion of the clad layer is at least about 82% of a thickness of the clad layer.

19 Claims, 5 Drawing Sheets

(51) Int. Cl.
    *C03B 17/06*     (2006.01)
    *C03B 17/02*     (2006.01)
    *C03C 17/02*     (2006.01)
(52) U.S. Cl.
    CPC ........ *C03C 21/002* (2013.01); *B32B 2250/03* (2013.01)

(56) References Cited

U.S. PATENT DOCUMENTS

| | | | |
|---|---|---|---|
| 3,597,305 A | 8/1971 | Giffen | |
| 3,630,704 A | 12/1971 | Garfinkel et al. | |
| 3,673,049 A | 6/1972 | Giffen et al. | |
| 3,676,043 A | 7/1972 | Anderson et al. | |
| 3,737,294 A | 6/1973 | Dumbaugh et al. | |
| 3,746,526 A | 7/1973 | Giffon | |
| 3,796,013 A | 3/1974 | Brown | |
| 3,798,013 A | 3/1974 | Inoue et al. | |
| 3,849,097 A | 11/1974 | Giffen et al. | |
| 3,857,689 A | 12/1974 | Koizumi et al. | |
| 3,931,438 A | 1/1976 | Beall et al. | |
| 3,958,052 A | 5/1976 | Galusha et al. | |
| 4,023,953 A | 5/1977 | Megles, Jr. et al. | |
| 4,102,664 A | 7/1978 | Dumbaugh, Jr. | |
| 4,180,758 A | 12/1979 | Notelteirs et al. | |
| 4,214,886 A | 7/1980 | Shay et al. | |
| 4,259,118 A | 3/1981 | Sack | |
| 4,457,771 A | 7/1984 | Ambrogi | |
| 5,342,426 A | 8/1994 | Dumbaugh, Jr. | |
| 5,559,060 A | 9/1996 | Dumbaugh, Jr. et al. | |
| 6,516,634 B1 | 2/2003 | Green et al. | |
| 6,844,669 B2 | 1/2005 | Sugawara et al. | |
| 7,201,965 B2 | 4/2007 | Gulati et al. | |
| 7,207,193 B2 | 4/2007 | Xun et al. | |
| 7,414,001 B2 | 8/2008 | Helfinstine et al. | |
| 7,430,080 B2 | 9/2008 | Cintz | |
| 7,430,880 B2 | 10/2008 | Butts et al. | |
| 7,514,149 B2 | 4/2009 | Bocko et al. | |
| 7,666,511 B2 | 2/2010 | Ellison et al. | |
| 7,681,414 B2 | 3/2010 | Pitbladdo | |
| 7,685,840 B2 | 3/2010 | Allaire et al. | |
| 7,818,980 B2 | 10/2010 | Burdette et al. | |
| 7,871,703 B2 | 1/2011 | Shelestak et al. | |
| 8,007,913 B2 | 8/2011 | Coppola et al. | |
| 8,075,999 B2 | 12/2011 | Barefoot et al. | |
| 8,211,505 B2 | 7/2012 | Bocko et al. | |
| 8,304,078 B2 | 11/2012 | Varshneya | |
| 8,312,739 B2 | 11/2012 | Lee et al. | |
| 8,321,739 B2 | 11/2012 | Lee et al. | |
| 8,415,013 B2 | 4/2013 | Barefoot et al. | |
| 8,518,545 B2 | 8/2013 | Akiba et al. | |
| 8,561,429 B2 | 10/2013 | Allan et al. | |
| 8,642,175 B2 | 2/2014 | Hashimoto et al. | |
| 8,685,873 B2 | 4/2014 | Siebers et al. | |
| 8,813,520 B2 | 8/2014 | Hashimoto et al. | |
| 8,916,487 B2 | 12/2014 | Kawai et al. | |
| 9,302,937 B2 | 4/2016 | Gulati et al. | |
| 9,422,188 B2 | 8/2016 | Garner et al. | |
| 9,957,190 B2 | 5/2018 | Finkeldey et al. | |
| 10,196,295 B2 | 2/2019 | Gulati et al. | |
| 2004/0197575 A1 | 10/2004 | Bocko et al. | |
| 2005/0083058 A1 | 4/2005 | Itoh et al. | |
| 2006/0127679 A1 | 6/2006 | Gulati et al. | |
| 2007/0190340 A1 | 8/2007 | Coppola et al. | |
| 2009/0202808 A1 | 8/2009 | Glaesemann et al. | |
| 2009/0217705 A1 | 9/2009 | Filippov et al. | |
| 2009/0220761 A1 | 9/2009 | Dejneka et al. | |
| 2010/0000259 A1 | 1/2010 | Ukrainczyk et al. | |
| 2010/0009154 A1 | 1/2010 | Allan et al. | |
| 2010/0029460 A1 | 2/2010 | Shojiya et al. | |
| 2010/0035038 A1 | 2/2010 | Barefoot et al. | |
| 2010/0084016 A1 | 4/2010 | Aitken et al. | |
| 2010/0129944 A1 | 5/2010 | Shimada et al. | |
| 2011/0017297 A1 | 1/2011 | Aitken et al. | |
| 2011/0019123 A1 | 1/2011 | Prest et al. | |
| 2011/0067447 A1 | 3/2011 | Zadesky et al. | |
| 2011/0200805 A1 | 8/2011 | Tamamoto et al. | |
| 2011/0281093 A1 | 11/2011 | Gulati et al. | |
| 2011/0294648 A1 | 12/2011 | Chapman et al. | |
| 2011/0312483 A1 | 12/2011 | Nakashima et al. | |
| 2011/0318555 A1 | 12/2011 | Bookbinder et al. | |
| 2012/0040146 A1 | 2/2012 | Garner et al. | |
| 2012/0194974 A1 | 8/2012 | Weber et al. | |
| 2012/0208028 A1 | 8/2012 | Hashimoto et al. | |
| 2012/0216569 A1 | 8/2012 | Allan et al. | |
| 2012/0219792 A1 | 8/2012 | Yamamoto et al. | |
| 2012/0236477 A1 | 9/2012 | Weber | |
| 2012/0236526 A1 | 9/2012 | Weber | |
| 2013/0063885 A1 | 4/2013 | Shedletsky et al. | |
| 2013/0224492 A1 | 8/2013 | Bookbinder et al. | |
| 2013/0236666 A1 | 9/2013 | Bookbinder et al. | |
| 2014/0109616 A1 | 4/2014 | Varshneya | |
| 2014/0139978 A1 | 5/2014 | Kwong | |
| 2014/0141217 A1 | 5/2014 | Gulati et al. | |
| 2014/0174131 A1 | 6/2014 | Saito et al. | |
| 2014/0227524 A1 | 8/2014 | Ellison et al. | |
| 2014/0370264 A1 | 12/2014 | Ohara et al. | |
| 2015/0030816 A1 | 1/2015 | Uemura et al. | |
| 2015/0030827 A1 | 1/2015 | Gomez et al. | |
| 2015/0037552 A1 | 2/2015 | Mauro | |
| 2015/0251383 A1 | 9/2015 | Beall et al. | |
| 2017/0141217 A1 | 5/2017 | Shirakawa et al. | |

FOREIGN PATENT DOCUMENTS

| | | | |
|---|---|---|---|
| CN | 103476727 A | 12/2013 | |
| CN | 103702952 A | 4/2014 | |
| EP | 1376647 A2 | 1/2004 | |
| GB | 1157898 | 7/1969 | |
| JP | 59-139005 A | 8/1984 | |
| JP | 2011-148683 A | 8/2011 | |
| JP | 2011-527661 | 11/2011 | |
| JP | 2013028512 A | 2/2013 | |
| JP | 2013-518800 A | 5/2013 | |
| JP | 2014-521582 A | 8/2014 | |
| JP | 2015-006959 A | 1/2015 | |
| JP | 2015-511573 A | 4/2015 | |
| KR | 10-2012-0026098 A | 3/2012 | |
| KR | 10-2013-0135834 A | 12/2013 | |
| TW | 201228970 A | 7/2012 | |
| TW | 201304951 A | 2/2013 | |
| TW | 201326060 A | 7/2013 | |
| WO | 2004/055837 A1 | 7/2004 | |
| WO | 2004/094321 A2 | 11/2004 | |
| WO | 2011/041484 A1 | 4/2011 | |
| WO | 2011/065293 A1 | 6/2011 | |
| WO | 2011/097314 A2 | 8/2011 | |
| WO | 2011103798 A1 | 9/2011 | |
| WO | 2012/001914 A1 | 1/2012 | |
| WO | 2012026098 A1 | 3/2012 | |
| WO | 2012/074983 A1 | 6/2012 | |
| WO | 2012/125857 A1 | 9/2012 | |
| WO | WO-2013016157 A1 * | 1/2013 | ............ C03C 3/091 |
| WO | 2013065648 A1 | 5/2013 | |
| WO | WO-2013065648 A1 * | 5/2013 | |
| WO | 2013/088856 A1 | 6/2013 | |
| WO | 2013/116420 A1 | 8/2013 | |
| WO | 2013/154034 A1 | 10/2013 | |
| WO | 2014030738 A1 | 2/2014 | |
| WO | 2014/055837 A2 | 4/2014 | |

OTHER PUBLICATIONS

Borrelli et al., "Glass Strengthening With an Ultrafast Laser," Dated 2008, pp. 185-189, Paper M404, International Congress on Applications of Lasers & Electro-Optics.

(56) References Cited

OTHER PUBLICATIONS

Clasen, "Preparation and Sintering of High-Density Green Bodies to High-Purity Silica Glasses", Jun. 11, 1986, pp. 335-343, Journal of Non-Crystalline Solids 89, Amsterdam.

Eagan et al., "Bubble Formation in Glass by Reaction With Si and Si—Ge Alloys", Journal of the American Ceramic Society, 1975, vol. 58, pp. 300-301.

Fillery et al.; "Ion-Exchanged Glass Laminates That Exhibit A Threshold Strength"; J. Am. Ceram. Soc., 90,8 (2007); pp. 2502-2509.

Fluegel, "Thermal Expansion Calculation for Silicate Glasses at 210° C. Based on a Systematic Analysis of Global Databases", Dated Feb. 2010, pp. 191-201, Glass Technol.: Dur. J. Glass Sci. Technol., Part A, vol. 51, No. 5.

Giordano, et al, "Glass Transition Temperatures of Natural Hydrous Melts: A Relationship With Shear Viscosity and Implications for the Welding Process", Oct. 22, 2003, pp. 105-118, Journal of Volcanolgoy and Geothermal Research 142, Munich, Germany.

Gy, Rene; Ion Exchange for Glass Strengthening; Nov. 2007; Materials Science & Engineering; vol. 149, pp. 159-165.

International Search Report and Written Opinion of the International Searching Authority; PCT/US2015/054348; dated Dec. 18, 2015; 15 Pages.

Lange, et al., "Heat Capacities of Fe2O3-Bearing Silicate Liquids", 1992, pp. 311-320, Contrib Mineral Petrol, Princeton, NY USA.

Lapp, "AMLCD Substrates Trends in Technology: Technical Information Paper," Dated Nov. 2014, pp. 1-5, Corning Incorporated, New York.

Richet, et al., "Energetics of Water Dissolution in Trachyte Glasses and Liquids", May 25, 2004, pp. 5151-5158, Geochimica et Cosmochimica Acta vol. 68, No. 24., Easton, PA USA.

Richet, et al., "Water and the Density of Silicate Glasses", Nov. 5, 1999, pp. 337-347, Contrib Mineral Petrol, Urbana, IL USA.

Rivers, et al., "Ultrasonic Studies of Silicate Melts", Aug. 10, 1987, pp. 9247-9270, Journal of Geophysical Research, vol. 92, Berkeley, CA USA.

Ussler, et al., "Phase Equilibria Along a Basalt-Rhyolite Mixing Line: Implications for the Origin of Calc-Alkaline Intermediate Magma", 1989, pp. 232-244, Contrib Mineral Petrol, Chapel Hill, NC USA.

Whittington, "The Viscosity of Hydrous Phonolites and Trachytes", Feb. 9, 2000, pp. 209-233, Chemical Geology 174, Hannover, Germany.

Japanese Patent Application No. 2017518965; Machine Translation of the Office Action dated Nov. 27, 2019; Japan Patent Office; 4 pgs.

R. Clasen; "Preparation and Sintering of High-Density Green Bodies to High-Purity Silica Glasses"; Journal of Non-Crystalline Solids 89 (1987); pp. 335-344.

Taiwan Patent Application No. 104133064; Office Action dated Oct. 19, 2020; 4 Pages; Taiwan Patent Office.

* cited by examiner

GLASS ARTICLE WITH DETERMINED STRESS PROFILE AND METHOD OF PRODUCING THE SAME

This application claims the benefit of priority under 35 U.S.C. § 371 of International Application No. PCT/US2015/054348, filed Oct. 7, 2015, which claims the benefit of priority to U.S. Provisional Application No. 62/060,941, filed Oct. 7, 2014, the content of each of which is incorporated herein by reference in its entirety.

BACKGROUND

1. Field

This disclosure relates generally to glass articles, and more particularly to strengthened glass articles having a determined stress profile.

2. Technical Background

Glass articles can be used in a wide variety of products including, for example, cover glass (e.g., for touch-screen devices such as smartphones, tablets, laptop computers, and monitors), auto-glazing, architectural panels, and appliances. Relatively large flaws can be introduced into the surfaces of glass articles during use. For example, it has been observed that flaws as deep as 300 μm have been introduced into a cover glass of a smartphone as a result of dropping the smartphone. Thus, it would be desirable for glass articles to have a high strength performance against deep flaws to improve the mechanical reliability of the glass articles.

SUMMARY

Disclosed herein are glass articles with determined stress profiles and methods for making such glass articles.

Disclosed herein is a laminated glass article comprising a core layer and a clad layer directly adjacent to the core layer. The core layer comprises a core glass composition. The clad layer comprises a clad glass composition. An average clad coefficient of thermal expansion (CTE) of the clad glass composition is less than an average core CTE of the core glass composition such that the clad layer is in compression and the core layer is in tension. A compressive stress of the clad layer decreases with increasing distance from an outer surface of the clad layer within an outer portion of the clad layer. The compressive stress of the clad layer remains substantially constant with increasing distance from the outer surface of the clad layer within an intermediate portion of the clad layer disposed between the outer portion of the clad layer and the core layer. A thickness of the intermediate portion of the clad layer is at least about 82% of a thickness of the clad layer.

Also disclosed herein is a glass article comprising a tensile region and a compressive region comprising an inner surface directly adjacent to the tensile region and an outer surface opposite the inner surface. An outer portion of the compressive region extends from the outer surface of the compressive region inward toward the tensile region to an outer depth of layer (DOL). An intermediate portion of the compressive region extends from the outer DOL inward toward the tensile region to an intermediate DOL. A compressive stress profile of the compressive region comprises a first compressive stress $CS_1$ and a second compressive stress $CS_2$. A compressive stress of the outer portion is $CS_1$ at the outer surface and $CS_2$ at the outer DOL. A compressive stress of the intermediate portion is substantially constant at $CS_2$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
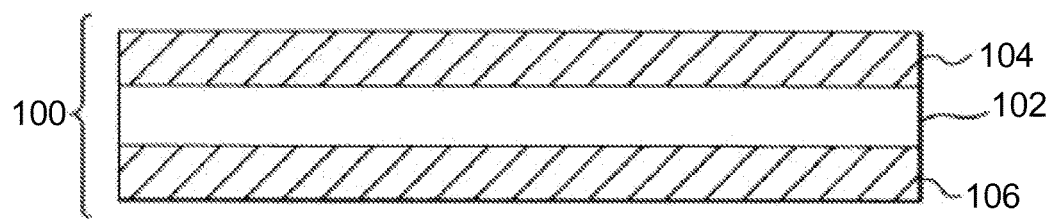
FIG. 1 is a partial cross-sectional view of one exemplary embodiment of a laminate structure of a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated.

Chemically strengthened glass is used as a cover glass for a variety of consumer electronics devices (e.g., smartphones, tablet computers, personal computers, ultrabooks, televisions, and cameras). Breakage of such cover glass can be caused by dropping the electronic device. Without wishing to be bound by any theory, it is believed that the two predominant failure modes of cover glass that result from dropping an electronic device are flexure failure and sharp contact failure. Flexure failure is caused by the cover glass bending as a result of the dynamic load to which the electronic device is subjected upon contacting the ground or other surface onto which the electronic device is dropped. Sharp contact failure is caused by sharp indentation on the cover glass surface when the glass drops onto a rough surface (e.g., asphalt, granite, gravel, etc.), which introduces damage into the cover glass. Chemical strengthening can significantly improve resistance of the cover glass to flexure failure by creating a compressive stress on the surface of the cover glass. However the chemically strengthened cover glass may be vulnerable to dynamic sharp contact failure because of the high stress concentration caused by the local indentation at the point of contact and depth of the flaws (e.g., up to about 300 µm) that can be generated by such contact compared to the depth of the compressive layer (e.g., up to about 80 µm). If the flaw is sufficiently deep to penetrate through the compressive stress region, the cover glass may fail. Although increasing the surface compressive stress of the cover glass and/or increasing the depth of the compressive layer can increase the resistance of the cover glass to failure caused by deep flaws, both of these techniques also increase the central tension of the cover glass. If the central tension is increased above a frangibility limit, the cover glass can exhibit frangible behavior, or extreme fragmentation behavior.

In various embodiments, a glass article comprises a tensile region and a compressive region directly adjacent to the tensile region. For example, the tensile region comprises a core layer of the glass article and the compressive region comprises a cladding layer of the glass article. In some embodiments, the compressive region comprises a first compressive region and a second compressive region, and the tensile region is disposed between the first compressive region and the second compressive region. For example, the cladding layer comprises a first cladding layer and a second cladding layer, and the core layer is disposed between the first cladding layer and the second cladding layer. The glass article can be symmetrical, meaning that the first compressive region and the second compressive region (and the respective stress profiles) are mirror images of each other. Alternatively, the glass article can be asymmetrical, meaning that the first compressive region and the second compressive region are not mirror images of each other. The compressive region comprises an inner surface directly adjacent to the tensile region and an outer surface opposite the inner surface. An outer portion of the compressive region extends from the outer surface of the compressive region inward toward the tensile region to an outer depth of layer (DOL). An intermediate portion of the compressive region extends from the outer DOL inward toward the tensile region to an intermediate DOL. The compressive stress region comprises a determined compressive stress profile comprising a first compressive stress $CS_1$ and a second compressive stress $CS_2$ that is less than $CS_1$. In some embodiments, $CS_1$ comprises a maximum compressive stress of the compressive region and/or $CS_2$ comprises a minimum compressive stress of the compressive region. Additionally, or alternatively, a compressive stress of the outer portion of the compressive region is $CS_1$ at the outer surface and $CS_2$ at the outer DOL, and a compressive stress of the intermediate portion is substantially constant at $CS_2$. For example, the compressive stress of the intermediate portion is within about 10%, within about 5%, within about 2%, or within about 1% of $CS_2$ throughout the thickness of the intermediate portion. Additionally, or alternatively, the slope of the stress profile (e.g., the slope of a linear trend line of the compressive stress as a function of depth within the glass article determined using simple linear regression) throughout the intermediate portion of the compressive region is substantially zero (e.g., between about −7 MPa/µm and about 7 MPa/µm, between about −5 MPa/µm and about 5 MPa/µm, between about −3 MPa/µm and about 3 MPa/µm, or between about −1 MPa/µm and about 1 MPa/µm). In some embodiments, the compressive stress region further comprises an inner portion extending from the intermediate DOL inward toward the tensile region to an inner DOL. The determined compressive stress profile further comprises a third compressive stress $CS_3$ that is between $CS_1$ and $CS_2$. In some embodiments, a compressive stress of the inner portion is $CS_2$ or substantially equal to $CS_2$ at the intermediate DOL and $CS_3$ at the inner DOL.

FIG. 1 is a cross-sectional view of one exemplary embodiment of a glass article 100. In some embodiments, glass article 100 comprises a laminate sheet comprising a plurality of glass layers. The laminate sheet can be substantially planar (i.e., flat) as shown in FIG. 1 or non-planar (i.e., curved). In other embodiments, the glass article comprises a shaped glass article. For example, the laminated sheet is contacted with a forming surface of a mold to form the shaped glass article. Glass article 100 comprises a core layer 102 disposed between a first cladding layer 104 and a second cladding layer 106. In some embodiments, first cladding layer 104 and second cladding layer 106 are exterior layers as shown in FIG. 1. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, the interfaces between first cladding layer 104 and core layer 102 and/or between second cladding layer 106 and core layer 102 are free of any bonding material such as, for example, a polymer interlayer, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass article comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer. The diffusion layer can comprise a blended region comprising components of each layer adjacent to the diffusion layer. In some embodiments, glass sheet 100 comprises a glass-glass laminate (e.g., an in situ fused multilayer glass-glass laminate) in which the interfaces between directly adjacent glass layers are glass-glass interfaces.

In some embodiments, core layer 102 comprises a core glass composition, and first and/or second cladding layers 104 and 106 comprise a clad glass composition that is different than the core glass composition. The core glass composition and the clad glass composition are different from each other prior to chemically strengthening the glass article as described herein. For example, in the embodiment shown in FIG. 1, core layer 102 comprises the core glass composition, and each of first cladding layer 104 and second cladding layer 106 comprises the clad glass composition. In other embodiments, the first cladding layer comprises a first clad glass composition, and the second cladding layer comprises a second clad glass composition that is different than the core glass composition and/or the first clad glass composition.

Figure 2:
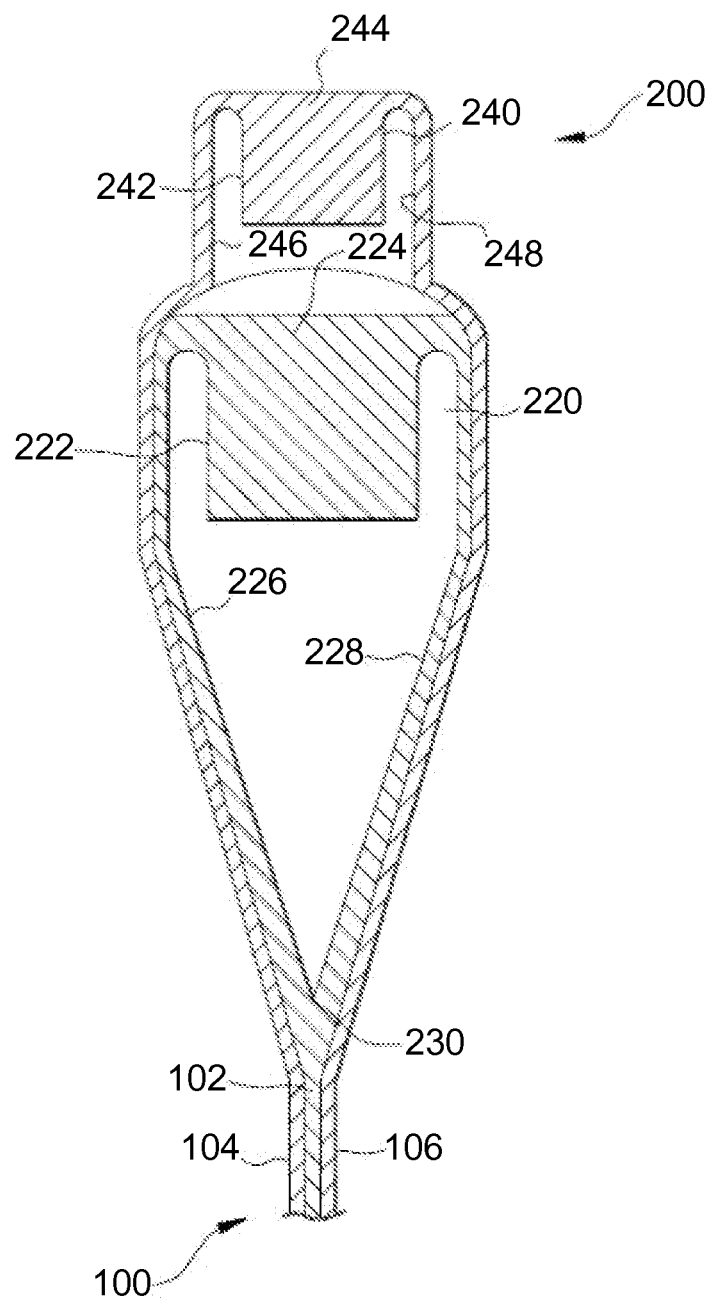
FIG. 2 is a cross-sectional view of one exemplary embodiment of a forming apparatus that can be used to form a glass article.

The glass article can be formed using a suitable process such as, for example, a fusion draw, down draw, slot draw, up draw, or float process. In some embodiments, the glass article is formed using a fusion draw process. FIG. 2 is a cross-sectional view of one exemplary embodiment of an overflow distributor 200 that can be used to form a glass article such as, for example, glass article 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A core glass composition 224 is melted and fed into trough 222 in a viscous state. Core glass composition 224 forms core layer 102 of glass article 100 as further described below. Upper overflow distributor 240 comprises a trough 242. A clad glass composition 244 is melted and fed into trough 242 in a viscous state. Clad glass composition 244 forms first and second cladding layers 104 and 106 of glass article 100 as further described below.

Core glass composition 224 overflows trough 222 and flows down opposing outer forming surfaces 226 and 228 of lower overflow distributor 220. Outer forming surfaces 226 and 228 converge at a draw line 230. The separate streams of core glass composition 224 flowing down respective outer forming surfaces 226 and 228 of lower overflow distributor 220 converge at draw line 230 where they are fused together to form core layer 102 of glass article 100.

Clad glass composition 244 overflows trough 242 and flows down opposing outer forming surfaces 246 and 248 of upper overflow distributor 240. Clad glass composition 244 is deflected outward by upper overflow distributor 240 such that the clad glass composition flows around lower overflow distributor 220 and contacts core glass composition 224 flowing over outer forming surfaces 226 and 228 of the lower overflow distributor. The separate streams of clad glass composition 244 are fused to the respective separate streams of core glass composition 224 flowing down respective outer forming surfaces 226 and 228 of lower overflow distributor 220. Upon convergence of the streams of core glass composition 224 at draw line 230, clad glass composition 244 forms first and second cladding layers 104 and 106 of glass article 100.

In some embodiments, core glass composition 224 of core layer 102 in the viscous state is contacted with clad glass composition 244 of first and second cladding layers 104 and 106 in the viscous state to form the laminated sheet. In some of such embodiments, the laminated sheet is part of a glass ribbon traveling away from draw line 230 of lower overflow distributor 220 as shown in FIG. 2. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass article 100 comprises the laminated sheet as shown in FIG. 1. In other embodiments, the laminated sheet can be processed further (e.g., by cutting or molding) to form glass article 100.

Although glass article 100 shown in FIG. 1 comprises three layers, other embodiments are included in this disclosure. In other embodiments, a glass article can have a determined number of layers, such as two, four, or more layers. For example, a glass article comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass article comprising four or more layers can be formed using additional overflow distributors and/or using overflow distributors with divided troughs. Thus, a glass article having a determined number of layers can be formed by modifying the overflow distributor accordingly.

In some embodiments, glass article 100 comprises a thickness of at least about 0.05 mm, at least about 0.1 mm, at least about 0.2 mm, or at least about 0.3 mm. Additionally, or alternatively, glass article 100 comprises a thickness of at most about 3 mm, at most about 2 mm, at most about 1.5 mm, at most about 1 mm, at most about 0.7 mm, or at most about 0.5 mm. For example, glass article comprises a thickness of from about 0.1 mm to about 3 mm, from about 0.1 mm to about 1 mm, or from about 0.3 mm to about 0.7 mm. In some embodiments, a ratio of a thickness of core layer 102 to a thickness of glass article 100 is at least about 0.5, at least about 0.7, at least about 0.8, at least about 0.85, at least about 0.9, or at least about 0.95. In some embodiments, a thickness of the second layer (e.g., each of first cladding layer 104 and second cladding layer 106) is from about 0.01 mm to about 0.3 mm.

In some embodiments, glass article 100 is mechanically strengthened. For example, the clad glass composition of first and/or second cladding layers 104 and 106 comprises a different average coefficient of thermal expansion (CTE) than the core glass composition of core layer 102. In some embodiments, first and second cladding layers 104 and 106 are formed from a glass composition having a lower average CTE than core layer 102. The CTE mismatch (i.e., the difference between the average CTE of first and second cladding layers 104 and 106 and the average CTE of core layer 102) results in formation of compressive stress in the cladding layers and tensile stress in the core layer upon cooling of glass article 100.

In some embodiments, the average CTE of core layer 102 and the average CTE of first and/or second cladding layers 104 and 106 differ by at least about $5\times10^{-7}$ $°C.^{-1}$, at least about $15\times10^{-7}$ $°C.^{-1}$, at least about $25\times10^{-7}$ $°C.^{-1}$, or at least about $30\times10^{-7}$ $°C.^{-1}$. Additionally, or alternatively, the average CTE of core layer 102 and the average CTE of first and/or second cladding layers 104 and 106 differ by at most about $100\times10^{-7}$ $°C.^{-1}$, at most about $75\times10^{-7}$ $°C.^{-1}$, at most about $50\times10^{-7}$ $°C.^{-1}$, at most about $40\times10^{-7}$ $°C.^{-1}$, at most about $30\times10^{-7}$ $°C.^{-1}$, at most about $20\times10^{-7}$ $°C.^{-1}$, or at most about $10\times10^{-7}$ $°C.^{-1}$. In some embodiments, the clad glass composition comprises an average CTE of at most about $66\times10^{-7}$ $°C.^{-1}$, at most about $55\times10^{-7}$ $°C.^{-1}$, at most about $50\times10^{-7}$ $°C.^{-1}$, at most about $40\times10^{-7}$ $°C.^{-1}$, or at most about $35\times10^{-7}$ $°C.^{-1}$. Additionally, or alternatively, the clad glass composition comprises an average CTE of at least about $10\times10^{-7}$ $°C.^{-1}$, at least about $15\times10^{-7}$ $°C.^{-1}$, at least about $25\times10^{-7}$ $°C.^{-1}$, or at least about $30\times10^{-7}$ $°C.^{-1}$. Additionally, or alternatively, the core glass composition comprises an average CTE of at least about 40×10⁻⁷° C.⁻¹, at least about 50×10⁻⁷° C.⁻¹, at least about 55×10⁻⁷° C.⁻¹, at least about 65×10⁻⁷° C.⁻¹, at least about 70×10⁻⁷° C.⁻¹, at least about 80×10⁻⁷° C.⁻¹, or at least about 90×10⁻⁷° C.⁻¹. Additionally, or alternatively, the core glass composition comprises an average CTE of at most about 120×10⁻⁷° C.⁻¹, at most about 110×10⁻⁷° C.⁻¹, at most about 100×10⁻⁷° C.⁻¹, at most about 90×10⁻⁷° C.⁻¹, at most about 75×10⁻⁷° C.⁻¹, or at most about 70×10⁻⁷° C.⁻¹.

In some embodiments, glass article 100 is chemically strengthened. For example, glass article 100 is strengthened using an ion exchange treatment to increase the compressive stress in a region of the glass article near an outer surface of the glass article (e.g., an outer portion of the compressive region as described herein). In some embodiments, the ion exchange treatment comprises applying an ion exchange medium to one or more surfaces of glass article 100. The ion exchange medium comprises a solution, a paste, a gel, or another suitable medium comprising larger ions to be exchanged with smaller ions in the glass matrix. For example, the compressive layer of glass article 100 comprises an alkali aluminosilicate glass. Thus, the smaller ions in the surface layer of the glass and the larger ions in the ion exchange medium are monovalent alkali metal cations (e.g., Li⁺, Na⁺, K⁺, Rb⁺, and/or Cs⁺). Alternatively, monovalent cations in glass article 100 may be replaced with monovalent cations other than alkali metal cations (e.g., Ag⁺ or the like). In some embodiments, the ion exchange medium comprises a molten salt solution, and the ion exchange treatment comprises immersing the laminated glass article in a molten salt bath comprising larger ions (e.g., K⁺ and/or Na⁺) to be exchanged with smaller ions (e.g., Na⁺ and/or Li⁺) in the glass matrix. In some embodiments, the molten salt bath comprises a salt (e.g., a nitrate, a sulfate, and/or a chloride) of the larger alkali metal ion. For example, the molten salt bath comprises molten KNO₃, molten NaNO₃, or a combination thereof. Additionally, or alternatively, the temperature of the molten salt bath is from about 380° C. to about 450° C., and an immersion time is from about 2 hours to about 16 hours. By replacing smaller ions in the glass matrix with larger ions at the surface of glass article 100, the compressive stress of the compressive layer is increased near the outer surface of the glass article.

Figure 3:
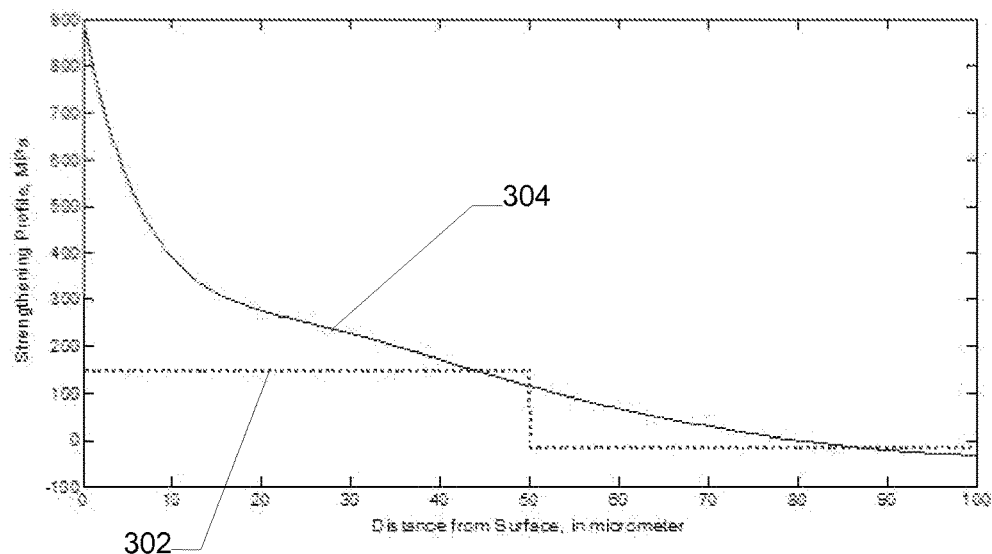
FIG. 3 is a graphical illustration comparing an exemplary mechanical stress profile generated by CTE mismatch alone and an exemplary chemical stress profile generated by chemical strengthening alone.

FIG. 3 is a graphical illustration comparing an exemplary mechanical stress profile 302 generated by CTE mismatch alone and an exemplary chemical stress profile 304 generated by chemical strengthening alone. The stress profiles are represented by the stress as a function of depth within the glass article. The depth within the glass article, given as the distance from an outer surface of the glass article, is plotted on the x-axis, and the stress is plotted on the y-axis.

Referring to mechanical stress profile 302, the compressive region (e.g., the clad layer) has a thickness of about 50 μm and a first compressive stress of about 150 MPa. Mechanical stress profile 302 is a step function. Thus, the compressive stress is substantially constant at the surface compressive stress throughout the compressive region, and the stress transitions from the surface compressive stress to the maximum tensile stress as a step change at the interface between the compressive region and the tensile region (e.g., at the interface between the clad layer and the core layer).

Referring to chemical stress profile 304, the compressive region extends to a DOL of about 80 μm and has a surface compressive stress of about 900 MPa. The stress transitions continuously from the surface compressive stress at the outer surface of the compressive region to the maximum tensile stress within the tensile region. Thus, in contrast to mechanical stress profile 302, chemical stress profile 304 does not have a region of constant compressive stress or a step change between the compressive stress region and the tensile region.

Figure 4:
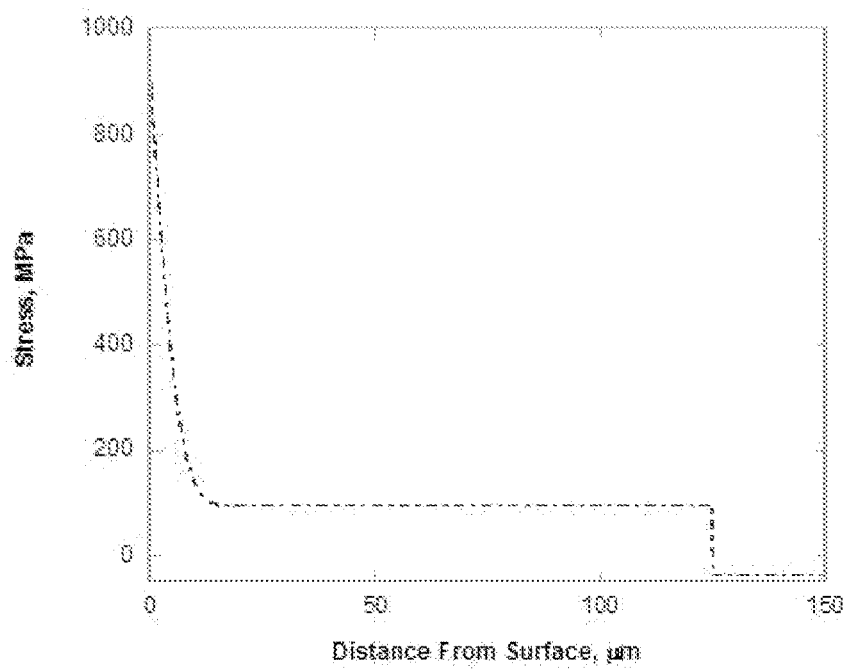
FIG. 4 is a graphical illustration of an exemplary combined stress profile formed by a combination of mechanical strengthening and chemical strengthening.

In some embodiments, glass article 100 is strengthened by a combination of mechanical strengthening and chemical strengthening. For example, glass article 100 comprising a CTE mismatch as described herein (e.g., a glass laminate) is chemically strengthened to further increase the compressive stress near the outer surface of the compressive layer. FIG. 4 is a graphical illustration of an exemplary combined stress profile formed by a combination of mechanical strengthening and chemical strengthening. The stress profile of a glass article can be measured using any suitable technique including, for example, using a birefringence based measurement technique or a refracted near-field (RNF) technique. Exemplary standards for stress measurement include, for example, ASTM C1422 and ASTM C1279. The stress profile comprises the stress in glass article 100 as a function of depth within the glass article. The depth within glass article 100, given as the distance from an outer surface of the glass article, is plotted on the x-axis, and the stress is plotted on the y-axis. The depth within the glass article may be referred to herein as depth of layer (DOL). Compressive stress is shown on the positive y-axis, and tensile stress is shown on the negative y-axis. However, the values of compressive and tensile stresses described herein refer to the absolute values of the stresses. Thus, tensile stresses are given herein as positive values as opposed to negative values. It will be recognized that FIG. 4 illustrates only a portion of the stress profile of glass article 100 through a portion of the thickness of the glass article (e.g., through one clad layer and a portion of the core layer). For a symmetrical glass article, the stress profile through the remaining portion of the thickness of the glass article is a mirror image of illustrated portion of the stress profile shown in FIG. 4. In the example shown in FIG. 4, the compressive region (e.g., the clad layer) has a thickness of about 125 μm, a first compressive stress of about 900 MPa, and a second compressive stress of about 100 MPa. The compressive stress region comprises an outer portion extending from the outer surface of the compressive region inward toward the tensile region to an outer DOL, and an intermediate portion extending from the outer DOL inward toward the tensile region to an intermediate DOL. In some embodiments, the outer portion of the compressive region comprises a surface ion exchanged region in which the glass composition profile and/or stress profile are generated, at least in part, by diffusion of larger ions into the glass matrix and smaller ions out of the glass matrix within the ion exchanged region (e.g., by subjecting the laminated glass article to the ion exchange treatment as described herein). For example, the surface ion exchanged region can be identified as having a stress profile with a particular shape indicating that it was generated at least partially by an ion exchange treatment (e.g., an error function). Additionally, or alternatively, the surface ion exchanged region can be identified as a region at the surface of the glass article in which compressive stress decreases as a function of depth within the glass article, compared to the substantially constant compressive stress within the intermediate portion of the compressive region. In the example shown in FIG. 4, the outer DOL is about 10 μm, and the intermediate DOL is about 125 μm. Thus, the thickness of the outer portion of the compressive region (represented by the outer DOL) is about 8% of the thickness of the compressive region or the clad layer, and the thickness of the intermediate portion of the compressive region is about 92% of the thickness of the compressive region or the clad layer. In some embodiments, the thickness of the outer portion of the compressive region is at most about 18%, at most about 16%, at most about 14%, at most about 12%, at most about 10%, at most about 8%, at most about 6%, at most about 4%, or at most about 2% of the thickness of the compressive region. Additionally, or alternatively, the thickness of the outer portion of the compressive region is at least about 0.1%, at least about 0.5%, or at least about 1% of the thickness of the compressive region. In some embodiments, the thickness of the intermediate portion of the compressive region is at least about 82%, at least about 84%, at least about 86%, at least about 88%, at least about 90%, at least about 92%, at least about 94%, at least about 96%, or at least about 98% of the thickness of the compressive region. Additionally, or alternatively, the thickness of the intermediate portion of the compressive region is at most about 99.9%, at most about 99.5%, or at most about 99% of the thickness of the compressive region. Restricting the thickness of the outer portion of the compressive region, or increasing the thickness of the intermediate portion of the compressive region, can enable a combination of improved retained strength and relatively low tensile stress within the glass article as described herein (e.g., by providing relatively high surface compressive stress, relatively thick compressive stress region or deep total DOL, and relatively low area under the compressive stress profile curve).

In the example shown in FIG. 4, the compressive stress decreases rapidly and continuously from the first compressive stress at the outer surface of the compressive region to the second compressive stress at the outer DOL, remains substantially constant at the second compressive stress from the outer DOL to the inner DOL, and then transitions from the second compressive stress to the maximum tensile stress as a step change at the interface between the compressive region and the tensile region. In the embodiment shown in FIG. 4, the intermediate DOL is equal to the thickness of the clad layer. In other embodiments, the intermediate DOL is less than the thickness of the clad layer.

In some embodiments, glass article 100 is chemically strengthened to increase the compressive stress in the outer portion of the clad layer without increasing the compressive stress in the intermediate portion of the clad layer. Thus, the chemical strengthening is performed in such a manner that less than an entire thickness of the compressive layer is chemically strengthened and the compressive layer comprises the intermediate portion with the substantially constant compressive stress, as described herein, after chemical strengthening. For example, the time over which chemical strengthening is performed and/or the temperature at which chemical strengthening is performed can be limited to limit the depth of the ion exchanged region.

Figure 5:
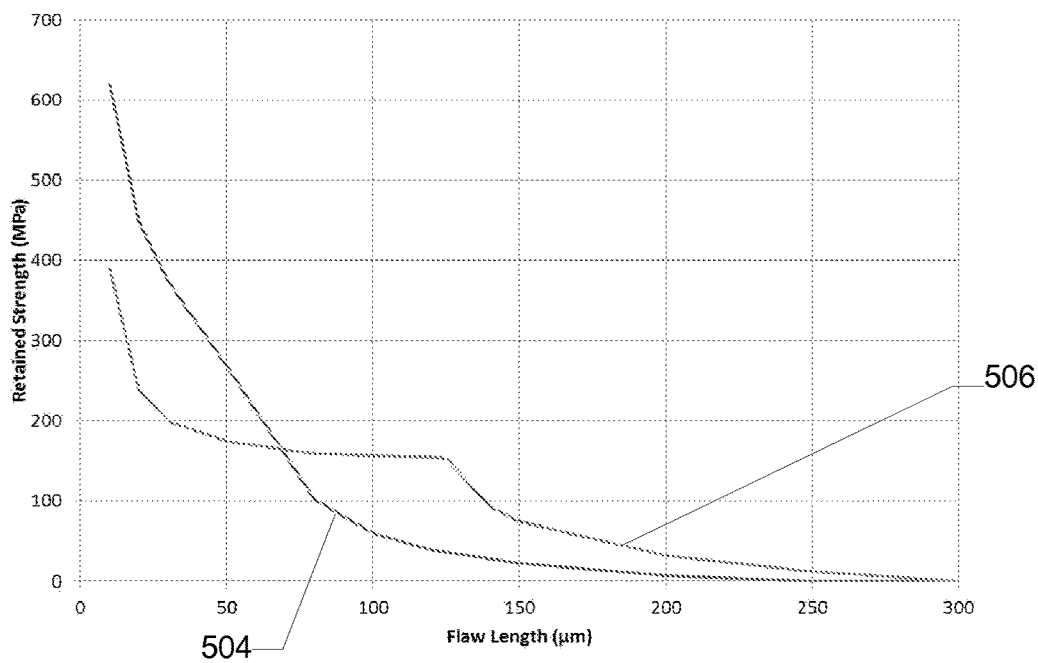
FIG. 5 is a graphical illustration comparing exemplary retained strength profiles corresponding to stress profiles generated by chemical strengthening alone and a combination of mechanical strengthening and chemical strengthening.

The retained strength of a glass article can be determined based on the stress profile of the glass article. For example, the retained strength is determined by forming a flaw extending from a surface of the glass article to a specified depth and then determining the strength of the glass article after formation of the flaw. The strength is the flexural strength of the glass article determined using, for example, a ring-on-ring test method (e.g., as described in ASTM C1499-09), a ball-on-ring test method, a three-point bend test method, a four-point bend test method, or another suitable method or technique. Such a retained strength determination can be conducted using a fracture mechanics simulation based on the stress profile of the glass article. FIG. 5 is a graphical illustration comparing exemplary retained strength profiles corresponding to stress profiles generated by chemical strengthening alone and a combination of mechanical strengthening and chemical strengthening. The retained strength profiles are represented by the retained strength as a function flaw size. The flaw size, given as the distance from an outer surface of the glass article to which the flaw extends, is plotted on the x-axis, and the retained strength is plotted on the y-axis. Chemical retained strength profile 504 was generated using a fracture mechanics simulation based on chemical stress profile 304 shown in FIG. 3, and combined retained strength profile 506 was generated using a fracture mechanics simulation based on the combined stress profile shown in FIG. 4.

As shown in FIG. 5, each of chemical retained strength profile 504 and combined retained strength profile 506 comprises a relatively high retained strength (e.g., at least about 200 MPa) near the outer surface of the glass article, which can aid in avoiding breakage of the glass article as a result of relatively shallow flaws (e.g., less than about 10 μm). However, combined retained strength profile 506 maintains a higher retained strength than chemical retained strength profile 504 deeper into the glass article. For example, the retained strength of combined retained strength profile 506 is higher than that of chemical retained strength profile 504 for flaw sizes from about 70 μm to about 300 μm, which can aid in avoiding breakage of the glass article as a result of relatively deep flaws. Flaws introduced into a cover glass as a result of dropping an electronic device (e.g., a smartphone) generally have flaw sizes from about 70 μm to about 300 μm. Thus, improved resistance to breakage resulting from such flaw sizes translates into improved drop performance for a cover glass comprising a retained strength profile similar to combined retained strength profile 506 as compared to retained strength profile 504. Moreover, the improved resistance to breakage resulting from large flaws can be achieved by combined retained strength profile 506 without substantially increasing the maximum tensile stress of the tensile region as compared to retained strength profile 504. For example, maintaining the compressive stress at a relatively constant level relatively deep into the compressive region (e.g., over the intermediate portion) can help to maintain the area under the compressive portion of the stress profile curve, which is proportional to the maximum tensile stress in the tensile region, relatively low while also providing protection against breakage caused by relatively deep flaws. Thus, the maximum tensile stress can be maintained below the frangibility limit. Additionally, or alternatively, the distance between the outer DOL and the intermediate DOL (i.e., the thickness of the intermediate portion of the compressive region) is sufficiently large to maintain relatively high compressive stress deep into the glass article (e.g., to achieve improved resistance to breakage resulting from large flaws) without increasing the maximum tensile stress to an unacceptable level (e.g., above the frangibility limit).

In some embodiments, the glass article is strengthened by ion exchange between the compressive region and the tensile region to form an inner portion of the compressive region adjacent to the tensile region and having an increased compressive stress relative to the intermediate portion of the compressive region. For example, glass article 100 is strengthened by ion exchange between first clad layer 104 and/or second clad layer 106 and core layer 102. In some embodiments, the inner portion of the compressive region comprises an interface ion exchanged region in which the glass composition profile and/or stress profile are generated, at least in part, by diffusion of larger ions into the glass matrix and smaller ions out of the glass matrix within the interface ion exchanged region (e.g., by ion exchange between the clad layer and the core layer at the interface therebetween as described herein). For example, the interface ion exchanged region can be identified as having a stress profile with a particular shape indicating that it was generated at least partially by ion exchange (e.g., an error function). Additionally, or alternatively, the interface ion exchanged region can be identified as a region at the interface between the compressive region and the tensile region in which compressive stress increases as a function of depth within the glass article, compared to the substantially constant compressive stress within the intermediate portion of the compressive region.

In some embodiments, first clad layer 104 and/or second clad layer 106 comprise a relatively low CTE, ion-exchangeable glass composition, and core layer 102 comprises a relatively high CTE, ion exchangeable glass composition. Suitable glass compositions can include those described in U.S. Patent Application Pub. No. 2014/0141217, which is incorporated herein by reference in its entirety. Examples of such glass compositions are shown in Table 1 in which IX410-8 stands for ion exchanged at 410° C. for 8 hours, CS stands for compressive stress, and DOL stands for depth of layer. In some embodiments, the core glass comprises a sufficiently high CTE for mechanical strengthening of the glass article and a sufficient $K_2O$ concentration for interfacial ion-exchange.

TABLE 1

Exemplary Low CTE Ion-Exchangeable Clad Glass Compositions

| (Mol %) | 1 | 2 | 3 | 4 | 5 | 6 | 7 | 8 | 9 | 10 |
|---|---|---|---|---|---|---|---|---|---|---|
| $SiO_2$ | 63.3 | 62.67 | 64.8 | 63.3 | 65.3 | 64.34 | 62.03 | 63.3 | 61.8 | 64.3 |
| $Al_2O_3$ | 11.4 | 11.29 | 10.94 | 11.4 | 11.4 | 11.59 | 11.17 | 11.4 | 12.15 | 11.58 |
| $B_2O_3$ | 9.2 | 9.11 | 8.82 | 9.2 | 7.2 | 7.7 | 9.02 | 9.2 | 9.2 | 9.34 |
| $P_2O_5$ | | | | | 0 | | | | | |
| MgO | 5.3 | 5.25 | 5.08 | 5.3 | 5.3 | 5.39 | 5.19 | 3.8 | 5.3 | 5.38 |
| CaO | 4.7 | 4.65 | 4.51 | 1.7 | 3.7 | 4.78 | 4.61 | 4.7 | 4.7 | 3.2 |
| BaO | 0 | 0 | 0 | 0 | 0 | 0 | 2 | 0 | 0 | 0 |
| ZnO | 0 | 0 | 0 | 0 | 0 | 0 | 0 | 0 | 0 | 0 |
| $Li_2O$ | 0 | 0 | 0 | 0 | 0 | 0 | 0 | 0 | 0 | 0 |
| $Na_2O$ | 4.2 | 4.16 | 4.03 | 7.2 | 6.2 | 4.27 | 4.12 | 5.7 | 4.95 | 4.27 |
| $K_2O$ | 1.8 | 1.78 | 1.73 | 1.8 | 0.8 | 1.83 | 1.76 | 1.8 | 1.8 | 1.83 |
| $SnO_2$ | 0.1 | 0.1 | 0.1 | 0.1 | 0.1 | 0.1 | 0.1 | 0.1 | 0.1 | 0.1 |
| $ZrO_2$ | 0 | 1 | 0 | 0 | 0 | 0 | 0 | 0 | 0 | 0 |
| Strain | 588 | 591 | 587 | 558 | 599 | 598 | 581 | 574 | 580 | 587 |
| Anneal | 639 | 644 | 639 | 608 | 649 | 650 | 624 | 623 | 631 | 640 |
| Softening | 879 | 874 | 882 | 852 | 890.8 | 888 | 835 | 860 | 862 | 888 |
| CTE | 50.7 | 50 | 49 | 60.5 | 52 | 50.9 | 57 | 55.2 | 53.7 | 48.7 |
| density | 2.395 | 2.422 | 2.387 | 2.379 | 2.403 | 2.405 | 2.447 | 2.395 | 2.404 | 2.377 |
| IX410-8 CS (31.8) | 315 | 412 | 306 | 517 | 446 | 316 | 316 | 412 | 364 | 318 |
| IX410-8 DOL (L) | 8 | 12 | 9 | 21 | 8 | 8 | 25 | 12 | 8 | 9 |

| (Mol %) | 11 | 12 | 13 | 14 | 15 | 16 | 17 | 18 | 19 | 20 | 21 |
|---|---|---|---|---|---|---|---|---|---|---|---|
| $SiO_2$ | 62.03 | 61.8 | 63.3 | 63.3 | 63.3 | 62.25 | 62.31 | 63.3 | 62.03 | 64.3 | 62.67 |
| $Al_2O_3$ | 11.17 | 11.87 | 11.4 | 11.4 | 11.4 | 11.21 | 11.22 | 11.4 | 11.17 | 11.4 | 11.29 |
| $B_2O_3$ | 9.02 | 9.58 | 9.2 | 9.2 | 9.2 | 10.7 | 9.06 | 9.2 | 9.02 | 8.2 | 9.11 |
| $P_2O_5$ | | | | 0 | | | | | | 0 | |
| MgO | 5.19 | 5.52 | 5.3 | 5.3 | 4.24 | 5.21 | 5.22 | 5.3 | 5.19 | 5.3 | 5.25 |
| CaO | 4.61 | 4.89 | 4.7 | 4.7 | 3.76 | 4.62 | 4.63 | 3.7 | 4.61 | 3.7 | 4.65 |
| BaO | 2 | 0 | 0 | 0 | 0 | 0 | 0 | 0 | 0 | 0 | 1 |
| ZnO | 0 | 0 | 0 | 0 | 0 | 0 | 0 | 0 | 0 | 0 | 0 |
| $Li_2O$ | 0 | 0 | 0 | 1 | 0 | 0 | 0 | 0 | 0 | 0 | 0 |
| $Na_2O$ | 4.12 | 4.37 | 5.2 | 3.2 | 6.93 | 4.13 | 5.7 | 6.2 | 4.12 | 6.2 | 4.16 |
| $K_2O$ | 1.76 | 1.87 | 0.8 | 1.8 | 1.07 | 1.77 | 1.77 | 0.8 | 1.76 | 0.8 | 1.78 |
| $SnO_2$ | 0.1 | 0.1 | 0.1 | 0.1 | 0.1 | 0.1 | 0.1 | 0.1 | 0.1 | 0.1 | 0.1 |
| $ZrO_2$ | 0 | 0 | 0 | 0 | 0 | 0 | 0 | 0 | 2 | 0 | 0 |
| Strain | 580 | 582 | 584 | 583 | 566 | 576 | 570 | 570 | 598 | 592 | 581 |
| Anneal | 628 | 632 | 635 | 630 | 613 | 626 | 618 | 612 | 650 | 642 | 624 |
| Softening | 821.8 | 862 | 867 | 861.7 | 840.5 | 856 | 843 | 822.4 | 878 | 877.9 | 841.1 |
| CTE | 54.8 | 51.6 | 49.1 | 48.4 | 57.8 | 51.2 | 56.4 | 59 | 48.8 | 51.4 | 57.7 |
| density | 2.503 | 2.404 | 2.397 | 2.4 | 2.397 | 2.385 | 2.413 | 2.404 | 2.453 | 2.399 | 2.41 |
| IX410-8 CS (31.8) | 645 | 325 | 361 | 370 | 561 | 308 | 418 | 453 | 323 | 436 | 304 |
| IX410-8 DOL (L) | 10 | 8 | 6 | 8 | 12 | 8 | 12 | 30 | 7 | 8 | 26 |

| (Mol %) | 22 | 23 | 24 | 25 | 26 | 27 | 28 | 29 | 30 | 31 | 32 | 33 |
|---|---|---|---|---|---|---|---|---|---|---|---|---|
| $SiO_2$ | 64.38 | 63.3 | 63.3 | 63.3 | 63.3 | 63.3 | 62.67 | 63.3 | 62.3 | 63.3 | 63.3 | 66.3 |
| $Al_2O_3$ | 9.9 | 11.4 | 11.4 | 11.4 | 11.4 | 11.4 | 11.29 | 11.4 | 11.22 | 11.4 | 11.4 | 11.4 |
| $B_2O_3$ | 9.36 | 9.2 | 9.2 | 9.2 | 9.2 | 9.2 | 9.11 | 9.2 | 9.06 | 9.2 | 9.2 | 6.2 |
| $P_2O_5$ | | | | | | 0 | | | | | 0 | 0 |
| MgO | 5.39 | 4.24 | 6.06 | 5.3 | 5.3 | 5.3 | 5.25 | 5.3 | 5.22 | 5.3 | 5.3 | 5.3 |
| CaO | 4.78 | 3.76 | 5.37 | 3.2 | 4.2 | 4.7 | 4.65 | 4.2 | 6.2 | 3.7 | 4.7 | 3.7 |
| BaO | 0 | 0 | 0 | 0 | 0 | 1 | 0 | 0 | 0 | 0 | 0 | 0 |
| ZnO | 0 | 0 | 0 | 0 | 0 | 0 | 0 | 0 | 0 | 0 | 0 | 0 |
| $Li_2O$ | 0 | 0 | 0 | 0 | 0 | 4.1 | 0 | 0 | 0 | 0 | 2.1 | 0 |
| $Na_2O$ | 4.27 | 6.9 | 3.96 | 5.7 | 5.2 | 0.1 | 4.16 | 5.2 | 4.13 | 6.2 | 2.1 | 6.2 |
| $K_2O$ | 1.83 | 1.07 | 0.61 | 1.8 | 1.3 | 1.8 | 1.78 | 1.3 | 1.77 | 0.8 | 1.8 | 0.8 |
| $SnO_2$ | 0.1 | 0.1 | 0.1 | 0.1 | 0.1 | 0.1 | 0.1 | 0.1 | 0.1 | 0.1 | 0.1 | 0.1 |

TABLE 1-continued

Exemplary Low CTE Ion-Exchangeable Clad Glass Compositions

| | | | | | | | | | | | | |
|---|---|---|---|---|---|---|---|---|---|---|---|---|
| ZrO$_2$ | 0 | 0 | 0 | 0 | 0 | 0 | 0 | 0 | 0 | 0 | 0 | 0 |
| Strain | 576 | 592 | 593 | 570 | 576 | 567 | 584 | 580 | 584 | 574 | 575 | 608 |
| Anneal | 625 | 635 | 637 | 621 | 619 | 612 | 631 | 628 | 633 | 624 | 622 | 659 |
| Softening | 860 | 800.6 | 853.2 | 862 | 843.1 | 831.2 | 850.5 | 859.3 | 860 | 849.4 | 848.9 | 906.2 |
| CTE | 52.4 | 63.4 | 53.6 | 53.4 | 59 | 45 | 51.8 | 51.9 | 52.3 | 52 | 46.4 | 51 |
| density | 2.39 | 2.406 | 2.444 | 2.388 | 2.397 | 2.396 | 2.447 | 2.399 | 2.414 | 2.394 | 2.399 | 2.403 |
| IX410-8 CS (31.8) | 317 | 489 | 318 | 412 | 379 | 357 | 396 | 476 | 269 | 529 | 369 | 440 |
| IX410-8 DOL (L) | 13 | 27 | 16 | 14 | 30 | 11 | 8 | 8 | 7 | 6 | 8 | 9 |

Exemplary glass compositions that can be used as core glass compositions and various properties of the glass compositions are shown in Table 2. In some embodiments, the core glass comprises large radius, mobile cations (e.g., K$^+$ and/or Cs$^+$) capable of exchanging with small radius, mobile cations (e.g., Na$^+$ and/or Li$^+$) in the clad glass. When heat is applied to glass article 100 (e.g., during forming of the glass article), the larger ions in the core glass exchange with the smaller ions in the clad glass. In some embodiments, heating glass article 100 during lamination is sufficient to cause the ion exchange between the clad layers and the core layer without any additional or subsequent ion exchange heat treatment. The ion exchange between the core layer and the clad layers increases the compressive stress in the inner portion of the compressive region extending from the intermediate DOL inward toward the tensile region to an inner DOL.

TABLE 2

Exemplary Core Glass Compositions

| | Example | | | | | | | |
|---|---|---|---|---|---|---|---|---|
| | 1 | 2 | 3 | 4 | 5 | 6 | 7 | 8 |
| Component (mol %) | | | | | | | | |
| SiO$_2$ | 68.92 | 69.95 | 65.20 | 72.97 | 74.97 | 70.97 | 70.97 | 70.97 |
| Al$_2$O$_3$ | 2.40 | 2.43 | 10.46 | 2.47 | 2.47 | 4.47 | 2.47 | 2.47 |
| B$_2$O$_3$ | 0.234 | 0.156 | 6.19 | 0.078 | 0.078 | 0.078 | 0.078 | 0.078 |
| MgO | 0.648 | 0.432 | 0 | 0.216 | 0.216 | 0.216 | 2.22 | 4.22 |
| CaO | 8.95 | 5.97 | 7.74 | 2.98 | 2.98 | 2.98 | 2.98 | 2.98 |
| SrO | 3.35 | 4.65 | 4.09 | 5.95 | 5.95 | 5.95 | 5.95 | 5.95 |
| BaO | 0 | 0 | 0 | 0 | 0 | 0 | 0 | 0 |
| K$_2$O | 14.85 | 15.74 | 6.25 | 14.62 | 12.62 | 14.62 | 14.62 | 12.62 |
| Na$_2$O | 0.5 | 0.5 | 0 | 0.5 | 0.5 | 0.5 | 0.5 | 0.5 |
| SnO$_2$ | 0.142 | 0.178 | 0.07 | 0.214 | 0.214 | 0.214 | 0.214 | 0.214 |
| Properties | | | | | | | | |
| Anneal point (° C.) | 618 | 605 | 669 | 604 | 620 | 625 | 610 | 629 |
| Strain point (° C.) | 571 | 559 | 623 | 556 | 568 | 575 | 561 | 578 |
| Softening point (° C.) | 802.4 | 794.5 | 893.2 | 799.2 | 821.9 | 828.3 | 807.3 | 833.6 |
| CTE (×10$^{-7}$/° C.) | 99.8 | 101.8 | 62.4 | 98.4 | 88.8 | 95 | 98 | 91.7 |
| Density (g/cm$^3$) | 2.566 | 2.573 | 2.515 | 2.566 | 2.551 | 2.567 | 2.576 | 2.753 |
| 24 h air liquidus (° C.) | 1030 | | 1030 | No devit >730° C. | No devit >765° C. | 1000 | 890 | 1000 |
| 24 h internal liquidus (° C.) | 1020 | Blisters 1045° C. | 1020 | No devit >730° C. | No devit >765° C. | 995 | 890 | 1000 |
| 24 h Pt liquidus (° C.) | 1015 | | 1010 | No devit >730° C. | No devit >765° C. | 990 | 885 | 960 |
| Primary Devit Phase | Potash feldspar | | Potash feldspar | | | Leucite | Potassium disilicate | Potassium disilicate |
| T$_{200\,Poise}$ (° C.) | | | 1601.3 | | 1527.7 | | | |
| T$_{35\,kPoise}$ (° C.) | | | 1177.7 | | 1076.9 | | | |
| Liquidus Viscosity (Poise) | | | 893k | | 1.17 × 10$^9$ | | | |

| | Example | | | | | | | |
|---|---|---|---|---|---|---|---|---|
| | 9 | 10 | 11 | 12 | 13 | 14 | 15 | 16 |
| Component (mol %) | | | | | | | | |
| SiO$_2$ | 72.97 | 71.75 | 73.93 | 71.75 | 73.75 | 73.75 | 71.75 | 71.75 |
| Al$_2$O$_3$ | 2.47 | 4.18 | 2.09 | 4.18 | 4.18 | 4.18 | 4.18 | 6.18 |
| B$_2$O$_3$ | 0.078 | 5.64 | 5.45 | 5.64 | 3.64 | 3.64 | 5.64 | 3.64 |
| MgO | 2.22 | 0 | 0 | 2 | 0 | 2 | 2 | 0 |

TABLE 2-continued

Exemplary Core Glass Compositions

| | | | | | | | | |
|---|---|---|---|---|---|---|---|---|
| CaO | 2.98 | 3.10 | 1.55 | 2.11 | 3.10 | 2.11 | 1.13 | 3.10 |
| SrO | 5.95 | 3.21 | 2.92 | 2.19 | 3.21 | 2.19 | 1.18 | 3.21 |
| BaO | 0 | 1.58 | 2.11 | 1.58 | 1.58 | 1.58 | 3.58 | 1.58 |
| $K_2O$ | 12.62 | 10.45 | 11.85 | 10.45 | 10.45 | 10.45 | 10.45 | 10.45 |
| $Na_2O$ | 0.5 | 0 | 0 | 0 | 0 | 0 | 0 | 0 |
| $SnO_2$ | 0.214 | 0.088 | 0.094 | 0.088 | 0.088 | 0.088 | 0.088 | 0.088 |
| Properties | | | | | | | | |
| Anneal point (° C.) | 622 | 640 | 662 | 636 | 645 | 647 | 635 | 652 |
| Strain point (° C.) | 572 | 596 | 619 | 591 | 598 | 599 | 588 | 605 |
| Softening point (° C.) | 828.4 | 830.9 | 814.7 | 836.7 | 842.6 | 859 | 838 | 864.2 |
| CTE (×$10^{-7}$/° C.) | 91.4 | 74.7 | 77.6 | 74.2 | 76.6 | 74.2 | 74.5 | 75.9 |
| Density (g/cm³) | 2.564 | 2.551 | 2.565 | 2.515 | 2.542 | 2.508 | 2.562 | 2.538 |
| 24 h air liquidus (° C.) | 935 | 910 | No devit >875° C. | | | | | 980 |
| 24 h internal liquidus (° C.) | 920 | 895 | No devit >875° C. | No devit >780° C. | No devit >760° C. | No devit >825° C. | No devit >870° C. | 965 |
| 24 h Pt liquidus (° C.) | 910 | 870 | No devit >875° C. | | | | | 960 |
| Primary Devit Phase | Potassium dislicate | unknown | | | | | | Potash feldspar |
| $T_{200\ Poise}$ (° C.) | 1510.9 | | | 1547.7 | 1565.4 | 1611.3 | 1552.4 | 1622.9 |
| $T_{35\ kPoise}$ (° C.) | 1088.6 | | | 1095.3 | 1109.6 | 1135.1 | 1096.4 | 1142.2 |
| Liquidus Viscosity (Poise) | $1.74 \times 10^6$ | | | $2.9 \times 10^8$ | $7.42 \times 10^8$ | $1.15 \times 10^8$ | $9.08 \times 10^6$ | $1.55 \times 10^6$ |

| | Example | | | | | | | |
|---|---|---|---|---|---|---|---|---|
| | 17 | 18 | 19 | 20 | 21 | 22 | 23 | 24 |
| Component (mol %) | | | | | | | | |
| $SiO_2$ | 72 | 65.2 | 65.2 | 65.2 | 66.09 | 66.28 | 66.18 | 66.26 |
| $Al_2O_3$ | 2.5 | 10.46 | 8.46 | 9.46 | 10.00 | 9.95 | 9.78 | 9.77 |
| $B_2O_3$ | 0 | 6.19 | 6.19 | 6.19 | 6.64 | 6.50 | 6.75 | 6.70 |
| MgO | 0 | 2 | 2 | 2 | 2.45 | 2.20 | 2.16 | 2.10 |
| CaO | 0 | 6.431 | 7.74 | 7.086 | 6.20 | 6.22 | 6.23 | 6.22 |
| SrO | 7.25 | 3.399 | 4.09 | 3.744 | 3.29 | 3.29 | 3.30 | 3.29 |
| BaO | 0 | 0 | 0 | 0 | 0.04 | 0.04 | 0.04 | 0.04 |
| $K_2O$ | 18 | 6.25 | 6.25 | 6.25 | 5.11 | 5.33 | 5.38 | 5.44 |
| $Na_2O$ | 0 | 0 | 0 | 0 | 0.09 | 0.09 | 0.09 | 0.09 |
| $SnO_2$ | 0.25 | 0.07 | 0.07 | 0.07 | 0.05 | 0.05 | 0.05 | 0.05 |
| Properties | | | | | | | | |
| Anneal point (° C.) | 597 | 670 | 662 | 668 | 660.2 | 657.8 | 660.5 | 660.1 |
| Strain point (° C.) | 551 | 622 | 619 | 623 | 610.2 | 608.9 | 610.2 | 609.8 |
| Softening point (° C.) | 787 | 904.8 | 885.7 | 893 | 901.4 | 898.4 | 898.1 | 893.2 |
| CTE (×$10^{-7}$/° C.) | 109 | 59.9 | 66 | 62.7 | 56.2 | 57.3 | 58 | 58.3 |
| Density (g/cm³) | 2.577 | 2.486 | 2.526 | 2.501 | 2.478 | 2.479 | 2.479 | 2.467 |
| 24 h air liquidus (° C.) | <780 | | | | | | | |
| 24 h internal liquidus (° C.) | <780 | | | | | | | |
| 24 h Pt liquidus (° C.) | <780 | | | | | | | |
| Primary Devit Phase | none | | | | | | | |
| $T_{200\ Poise}$ (° C.) | | 1630 | 1555 | 1596 | 1626.8 | 1640.6 | 1619.4 | 1623.2 |
| $T_{35\ kPoise}$ (° C.) | | 1188 | 1139 | 1175 | 1188.3 | 1191.4 | 1185.3 | 1186.1 |
| Liquidus Viscosity (Poise) | | 356K | | 278k | | | | |

| | Example | | | | | | | |
|---|---|---|---|---|---|---|---|---|
| | 25 | 26 | 27 | 28 | 29 | 30 | 31 | 32 |
| Component (mol %) | | | | | | | | |
| $SiO_2$ | 66.28 | 66.33 | 66.64 | 66.56 | 66.47 | 66.72 | 66.69 | 66.34 |
| $Al_2O_3$ | 9.78 | 9.51 | 9.57 | 9.49 | 9.51 | 9.77 | 9.91 | 9.90 |
| $B_2O_3$ | 6.65 | 6.88 | 6.65 | 6.73 | 6.63 | 6.08 | 5.97 | 6.17 |
| MgO | 2.06 | 2.02 | 1.94 | 1.96 | 1.93 | 1.92 | 1.92 | 1.93 |
| CaO | 6.26 | 6.26 | 6.15 | 6.17 | 6.24 | 6.24 | 6.23 | 6.28 |
| SrO | 3.27 | 3.28 | 3.24 | 3.25 | 3.27 | 3.26 | 3.27 | 3.29 |

TABLE 2-continued

Exemplary Core Glass Compositions

| | | | | | | | | |
|---|---|---|---|---|---|---|---|---|
| BaO | 0.04 | 0.04 | 0.04 | 0.04 | 0.04 | 0.04 | 0.04 | 0.04 |
| $K_2O$ | 5.47 | 5.50 | 5.59 | 5.63 | 5.75 | 5.78 | 5.79 | 5.86 |
| $Na_2O$ | 0.09 | 0.09 | 0.09 | 0.09 | 0.09 | 0.10 | 0.09 | 0.09 |
| $SnO_2$ | 0.05 | 0.05 | 0.06 | 0.06 | 0.06 | 0.06 | 0.06 | 0.06 |
| Properties | | | | | | | | |
| Anneal point (° C.) | 660.1 | 658.5 | 658.8 | 660.3 | 657.5 | 658 | 660.6 | 660.4 |
| Strain point (° C.) | 609.4 | 607.8 | 610.1 | 609.4 | 607.7 | 609.1 | 610.5 | 610 |
| Softening point (° C.) | 898.4 | 892.5 | 887.3 | 896.4 | 891.8 | 900.4 | 899.3 | 898.5 |
| CTE ($\times 10^{-7}$/° C.) | 58.2 | 58.2 | 58.2 | 58.7 | 59.5 | 59.3 | 59 | 59.2 |
| Density (g/cm$^3$) | 2.467 | 2.466 | 2.464 | 2.465 | 2.466 | 2.466 | 2.469 | 2.469 |
| Primary Devit Phase | | | | | | | | |
| $T_{200\ Poise}$ (° C.) | 1632.6 | 1621.6 | 1640.7 | 1613.9 | 1637.0 | 1652.4 | 1653.2 | 1639.3 |
| $T_{35\ kPoise}$ (° C.) | 1191.3 | 1184.5 | 1191.3 | 1182.6 | 1190.9 | 1197.0 | 1201.0 | 1194.0 |
| Liquidus Viscosity (Poise) | | | | | | | | |

| | Example | | | | | | | |
|---|---|---|---|---|---|---|---|---|
| | 33 | 34 | 35 | 36 | 37 | 38 | 39 | 40 |
| Component (mol %) | | | | | | | | |
| $SiO_2$ | 66.54 | 66.47 | 65.37 | 64.30 | 63.91 | 63.55 | 63.53 | 63.49 |
| $Al_2O_3$ | 10.03 | 10.00 | 9.84 | 9.67 | 9.57 | 9.55 | 9.59 | 9.55 |
| $B_2O_3$ | 6.00 | 6.10 | 6.47 | 6.86 | 6.94 | 7.22 | 7.15 | 7.13 |
| MgO | 1.90 | 1.89 | 2.12 | 2.32 | 2.40 | 2.44 | 2.46 | 2.46 |
| CaO | 6.23 | 6.21 | 6.64 | 7.05 | 7.26 | 7.32 | 7.31 | 7.39 |
| SrO | 3.28 | 3.26 | 3.51 | 3.76 | 3.86 | 3.89 | 3.92 | 3.95 |
| BaO | 0.04 | 0.04 | 0.04 | 0.04 | 0.04 | 0.04 | 0.04 | 0.04 |
| $K_2O$ | 5.79 | 5.83 | 5.83 | 5.81 | 5.82 | 5.80 | 5.81 | 5.77 |
| $Na_2O$ | 0.09 | 0.09 | 0.09 | 0.09 | 0.09 | 0.10 | 0.09 | 0.10 |
| $SnO_2$ | 0.07 | 0.07 | 0.07 | 0.07 | 0.07 | 0.07 | 0.07 | 0.08 |
| Properties | | | | | | | | |
| Anneal point (° C.) | 661.2 | 663.2 | 658.7 | 658.6 | 657.7 | 655.8 | 658.4 | 654.2 |
| Strain point (° C.) | 611.3 | 612.4 | 610.6 | 608.4 | 608.4 | 607.2 | 608.6 | 605.9 |
| Softening point (° C.) | 904 | 904.3 | 896.1 | 877.6 | 875.3 | 875.1 | 873.8 | 870.4 |
| CTE ($\times 10^{-7}$/° C.) | 58.7 | | 60.2 | 61.2 | 62.5 | 62.4 | 62.7 | 62.2 |
| Density (g/cm$^3$) | 2.47 | 2.469 | 2.482 | 2.496 | 2.501 | 2.503 | 2.504 | 2.505 |
| Primary Devit Phase | Potash Feldspar | | | | | | | |
| $T_{200\ Poise}$ (° C.) | 1650.7 | 1638.3 | 1605.3 | 1562.1 | 1553.7 | 1545.7 | 1537.3 | 1528.9 |
| $T_{35\ kPoise}$ (° C.) | 1198.5 | 1195.7 | 1174.7 | 1156.0 | 1150.7 | 1144.2 | 1143.8 | 1136.6 |
| Liquidus Viscosity (Poise) | 1251 | | | | | | | |

| | Example | | | | | | | |
|---|---|---|---|---|---|---|---|---|
| | 41 | 42 | 43 | 44 | 45 | 46 | 47 | 48 |
| Component (mol %) | | | | | | | | |
| $SiO_2$ | 63.54 | 63.46 | 64.07 | 66.23 | 66.52 | 68.18 | 69.50 | 70.83 |
| $Al_2O_3$ | 9.55 | 9.56 | 9.31 | 9.07 | 8.23 | 7.57 | 6.98 | 6.36 |
| $B_2O_3$ | 7.08 | 7.09 | 6.89 | 6.87 | 6.40 | 6.01 | 5.87 | 5.73 |
| MgO | 2.47 | 2.49 | 2.37 | 0.23 | 1.89 | 1.58 | 1.29 | 1.06 |
| CaO | 7.39 | 7.41 | 7.15 | 6.83 | 5.88 | 5.08 | 4.34 | 3.64 |
| SrO | 3.93 | 3.95 | 3.96 | 4.08 | 4.02 | 4.02 | 4.00 | 4.02 |
| BaO | 0.04 | 0.04 | 0.04 | 0.05 | 0.04 | 0.04 | 0.04 | 0.04 |
| $K_2O$ | 5.80 | 5.79 | 5.96 | 6.43 | 6.81 | 7.30 | 7.76 | 8.11 |
| $Na_2O$ | 0.09 | 0.09 | 0.10 | 0.10 | 0.10 | 0.10 | 0.10 | 0.10 |
| $SnO_2$ | 0.07 | 0.07 | 0.09 | 0.08 | 0.08 | 0.08 | 0.08 | 0.08 |
| Properties | | | | | | | | |
| Anneal point (° C.) | 655.2 | 657.2 | 653.6 | 661.6 | 667.3 | 662.7 | 656.6 | 646.4 |
| Strain point (° C.) | 607.5 | 608.5 | 606.5 | 608.2 | 610.5 | 607.4 | 602.6 | 596.8 |
| Softening point (° C.) | 864.1 | 870.5 | 873 | 874.2 | 886 | 888.2 | 870.8 | 862 |
| CTE ($\times 10^{-7}$/° C.) | 62.2 | 62.4 | 62.3 | 64.8 | 66.2 | 67.8 | 69.2 | 68.5 |
| Density (g/cm$^3$) | 2.505 | 2.507 | 2.505 | | 2.489 | 2.48 | 2.477 | 2.476 |
| Primary Devit Phase | | Potash Feldspar | | | | | | |

TABLE 2-continued

Exemplary Core Glass Compositions

| | | | | | | | | |
|---|---|---|---|---|---|---|---|---|
| $T_{200\ Poise}$ (° C.) | 1540.9 | 1523.4 | 1574.7 | 1551.5 | 1546.4 | 1569.4 | 1570.8 | 1575.7 |
| $T_{35\ kPoise}$ (° C.) | 1140.6 | 1136.1 | 1155.8 | 1153.6 | 1156.0 | 1162.4 | 1160.0 | 1154.4 |
| Liquidus Viscosity (Poise) | | 256 | | | | | | |

| | Example | | | | | | | |
|---|---|---|---|---|---|---|---|---|
| | 49 | 50 | 51 | 52 | 553 | 54 | 55 | 56 |
| Component (mol %) | | | | | | | | |
| $SiO_2$ | 71.28 | 71.44 | 71.42 | 71.47 | 71.31 | 71.34 | 71.35 | 71.47 |
| $Al_2O_3$ | 6.21 | 6.16 | 6.12 | 6.11 | 6.09 | 6.05 | 6.05 | 6.03 |
| $B_2O_3$ | 5.56 | 5.38 | 5.46 | 5.46 | 5.69 | 5.73 | 5.56 | 5.41 |
| MgO | 0.99 | 0.97 | 0.96 | 0.94 | 0.96 | 0.94 | 0.91 | 0.78 |
| CaO | 3.47 | 3.43 | 3.41 | 3.39 | 3.37 | 3.32 | 3.21 | 2.79 |
| SrO | 4.01 | 4.04 | 4.03 | 4.03 | 4.03 | 4.02 | 4.12 | 4.26 |
| BaO | 0.04 | 0.04 | 0.04 | 0.04 | 0.04 | 0.04 | 0.05 | 0.05 |
| $K_2O$ | 8.23 | 8.32 | 8.34 | 8.34 | 8.31 | 8.33 | 8.54 | 8.98 |
| $Na_2O$ | 0.10 | 0.10 | 0.10 | 0.10 | 0.10 | 0.10 | 0.09 | 0.10 |
| $SnO_2$ | 0.08 | 0.08 | 0.08 | 0.09 | 0.08 | 0.09 | 0.10 | 0.10 |
| Properties | | | | | | | | |
| Anneal point (° C.) | 638.4 | 640.2 | 638.9 | 637.8 | 639.3 | 638 | 636.8 | 635.6 |
| Strain point (° C.) | 592 | 592.3 | 590.6 | 591.4 | 592 | 589.5 | 589.7 | 587.8 |
| Softening point (° C.) | 860.5 | 857.4 | 854.9 | 857.9 | 853.6 | 858.8 | 856.4 | 854.8 |
| CTE ($\times 10^{-7}$/° C.) | 69.4 | 69.8 | 69.7 | 69.7 | 70 | 70.4 | 70.7 | 71.4 |
| Density (g/cm$^3$) | 2.475 | 2.477 | 2.477 | 2.477 | 2.478 | 2.478 | 2.482 | 2.485 |
| Primary Devit Phase | | | | | | | | |
| $T_{200\ Poise}$ (° C.) | 1594.1 | 1581.1 | 1580.9 | 1590.9 | 1579.2 | 1586.6 | 1586.9 | 1573.7 |
| $T_{35\ kPoise}$ (° C.) | 1156.2 | 1153.1 | 1151.8 | 1154.0 | 1151.3 | 1154.3 | 1151.8 | 1147.1 |
| Liquidus Viscosity (Poise) | | 256 | | | | | | |

| | Example | | | | | | | |
|---|---|---|---|---|---|---|---|---|
| | 57 | 58 | 59 | 60 | 61 | 62 | 63 | 64 |
| Component (mol %) | | | | | | | | |
| $SiO_2$ | 71.53 | 71.90 | 71.95 | 72.33 | 71.98 | 72.10 | 72.09 | 72.42 |
| $Al_2O_3$ | 6.03 | 6.02 | 6.00 | 6.01 | 6.00 | 5.99 | 5.99 | 6.01 |
| $B_2O_3$ | 5.23 | 4.82 | 4.77 | 4.13 | 4.57 | 4.49 | 4.46 | 4.05 |
| MgO | 0.66 | 0.38 | 0.20 | 0.07 | 0.08 | 0.02 | 0.02 | 0.00 |
| CaO | 2.36 | 1.48 | 0.85 | 0.39 | 0.42 | 0.21 | 0.20 | 0.16 |
| SrO | 4.43 | 4.70 | 4.87 | 5.08 | 5.06 | 5.11 | 5.13 | 5.16 |
| BaO | 0.05 | 0.05 | 0.05 | 0.06 | 0.06 | 0.06 | 0.06 | 0.06 |
| $K_2O$ | 9.47 | 10.42 | 11.07 | 11.66 | 11.57 | 11.77 | 11.80 | 11.87 |
| $Na_2O$ | 0.11 | 0.11 | 0.11 | 0.11 | 0.11 | 0.11 | 0.11 | 0.11 |
| $SnO_2$ | 0.10 | 0.10 | 0.10 | 0.11 | 0.11 | 0.11 | 0.11 | 0.12 |
| Properties | | | | | | | | |
| Anneal point (° C.) | 633.9 | 628.5 | 627.7 | 625.7 | 623.6 | 624.4 | 623.5 | 621.6 |
| Strain point (° C.) | 586.4 | 582.3 | 580.7 | 579 | 577.4 | 577.1 | 576.3 | 575.1 |
| Softening point (° C.) | 847.6 | 844 | 836.1 | 834.7 | 840 | 830.6 | 831.2 | 833.9 |
| CTE ($\times 10^{-7}$/° C.) | 73.3 | 76.5 | 78.1 | 80.2 | 78.8 | 80.2 | 80.5 | 80.2 |
| Density (g/cm$^3$) | 2.492 | 2.5 | 2.504 | 2.51 | 2.511 | 2.511 | 2.512 | 2.513 |
| Primary Devit Phase | | | | | | | | Unknown Feldspar |
| $T_{200\ Poise}$ (° C.) | 1573.5 | 1546.1 | 1544.9 | 1545.3 | 1550.1 | 1530.4 | 1544.4 | 1537.1 |
| $T_{35\ kPoise}$ (° C.) | 1145.2 | 1127.4 | 1128.0 | 1126.6 | 1126.5 | 1119.1 | 1124.8 | 1118.9 |
| Liquidus Viscosity (Poise) | | | | | | | | 544 |

In some embodiments, the clad glass comprises an ion-exchangeable glass with a sufficiently low CTE for mechanical strengthening of the glass article. For example, in one exemplary embodiment, the clad glass comprises about 65 mol. % to about 70 mol. % $SiO_2$; about 9 mol. % to about 14 mol. % $Al_2O_3$; and about 0 mol. % to about 11 mol. % $B_2O_3$ as glass network formers; about 5 mol. % to about 10 mol. % alkali oxide $R_2O$, wherein R is at least one of Li, Na, and K; and about 3 mol. % to about 11 mol. % of divalent oxide MO, wherein M is at least one of Mg, Ca, Ba, and Zn. Such glass compositions generally have an average CTE that is less than or equal to $55 \times 10^{-7}$/° C. and are amenable to strengthening by ion-exchange.

In another exemplary embodiment, the clad glass comprises about 65 mol. % to about 68 mol. % $SiO_2$; about 10 mol. % to about 13 mol. % $Al_2O_3$; and about 6 mol. % to about 9 mol. % $B_2O_3$ as glass network formers; about 6 mol. % to about 9 mol. % alkali oxide $R_2O$, wherein R is at least one of Li, Na, and K; and about 7 mol. % to about 10 mol. % of divalent oxide MO, wherein M is at least one of Mg, Ca, Ba, and Zn. Such glass compositions generally have an average CTE that is less than or equal to $55 \times 10^{-7}/°C$. and are amenable to strengthening by ion-exchange.

Figure 6:
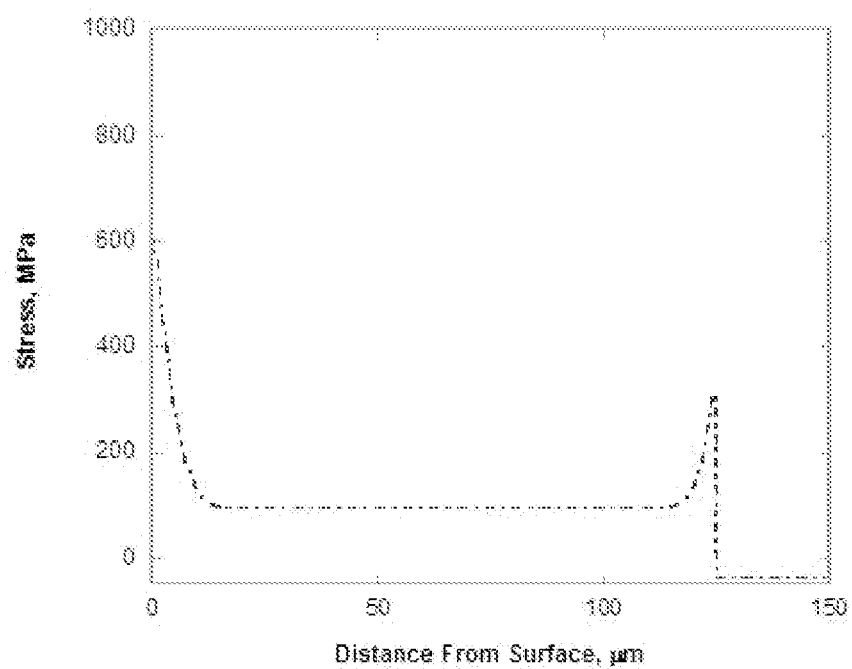
FIG. 6 is a graphical illustration of an exemplary stress profile formed by a combination of mechanical strengthening, chemical strengthening, and ion exchange between the compressive region and the tensile region.

FIG. 6 is a graphical illustration of an exemplary stress profile formed by a combination of mechanical strengthening, chemical strengthening, and ion exchange between the compressive region and the tensile region. In the example shown in FIG. 6, the compressive region has a thickness of about 125 µm, a first compressive stress of about 600 MPa, a second compressive stress of about 100 MPa, and a third compressive stress of about 300 MPa. The compressive stress region comprises an outer portion (e.g., a surface ion exchanged region) extending from the outer surface of the compressive region inward toward the tensile region to an outer DOL, an intermediate portion extending from the outer DOL inward toward the tensile region to an intermediate DOL, and an inner portion (e.g., an interface ion exchanged region) extending from the intermediate DOL inward toward the tensile region to an inner DOL. In the example shown in FIG. 6, the outer DOL is about 10 µm, the intermediate DOL is about 115 µm, and the inner DOL is about 125 µm. Thus, the compressive stress decreases rapidly and continuously from the first compressive stress at the outer surface of the compressive region to the second compressive stress at the outer DOL, remains substantially constant at the second compressive stress from the outer DOL to the intermediate DOL, increases rapidly and continuously from the second compressive stress at the intermediate DOL to the third compressive stress at the inner DOL, and then transitions from the third compressive stress to the maximum tensile stress as a step change at the interface between the compressive region and the tensile region. The increased compressive stress of the inner portion of the compressive region can further increase the resistance of the glass article to breakage caused by deep flaws without increasing the maximum tension of the tensile region sufficiently to cause the glass article to display frangible behavior.

In some embodiments, $CS_1$ is at least about 400 MPa, at least about 500 MPa, at least about 600 MPa, at least about 700 MPa, at least about 800 MPa, or at least about 900 MPa. Additionally, or alternatively, $CS_1$ is at most about 1000 MPa or at most about 900 MPa. For example, $CS_1$ is from about 400 MPa to about 1000 MPa.

In some embodiments, $CS_2$ is at least about 50 MPa, at least about 100 MPa, at least about 200 MPa, or at least about 300 MPa. Additionally, or alternatively, $CS_2$ is at most about 450 MPa, at most about 400 MPa, at most about 300 MPa, or at most about 200 MPa. For example, $CS_2$ is from about 50 MPa to about 450 MPa.

In some embodiments, $CS_3$ is at least about 100 MPa, at least about 200 MPa, at least about 300 MPa, or at least about 400 MPa. Additionally, or alternatively, $CS_3$ is at most about 800 MPa, at most about 700 MPa, or at most about 600 MPa. For example, $CS_3$ is from about 100 MPa to about 800 MPa.

In some embodiments, the outer DOL is at least about 10 µm, at least about 20 µm, at least about 30 µm, or at least about 40 µm. Additionally, or alternatively, the outer DOL is at most about 50 µm, at most about 40 µm, or at most about 30 µm. For example, the outer DOL is from about 10 µm to about 50 µm.

In some embodiments, the intermediate DOL is at least about 30 µm, at least about 50 µm, at least about 70 µm, or at least about 90 µm. Additionally, or alternatively, the intermediate DOL is at most about 250 µm, at most about 200 µm, at most about 170 µm, at most about 150 µm, at most about 130 µm, at most about 120 µm, at most about 100 µm, at most about 80 µm, or at most about 60 µm. For example, intermediate DOL is from about 30 µm to about 250 µm.

In some embodiments, the inner DOL corresponds to the interface between the compressive region and the tensile region. For example, the inner DOL is equal to or substantially equal to the thickness of the respective clad layer of the glass article.

In some embodiments, the glass article comprises a laminated glass composite comprising a first glass layer and a second glass layer. The first glass layer comprises a first glass composition, and the second glass layer comprises a second glass composition that is different than the first glass composition. The first glass layer comprises an exterior surface and an interior surface. The second glass layer directly contacts the interior surface of the first glass layer. The first glass layer is in compression, and the second glass layer is in tension. A variable compressive stress profile of the first glass layer comprises a first region and a second region. In the first region, the compressive stress decreases in an inward direction from the exterior surface toward the interior surface. In the second region, the compressive stress remains substantially constant (e.g., within about 20%, within about 10%, within about 5%, or within about 2% of an average compressive stress of the second region).

The glass articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications.

It will be apparent to those skilled in the art that various modifications and variations can be made without departing from the spirit or scope of the invention. Accordingly, the invention is not to be restricted except in light of the attached claims and their equivalents.

What is claimed is:

1. A laminated glass article comprising:
    a core layer comprising a core glass composition; and
    a clad layer directly adjacent to the core layer and comprising a clad glass composition, an average clad coefficient of thermal expansion (CTE) of the clad glass composition less than an average core CTE of the core glass composition such that the clad layer is in compression and the core layer is in tension;
    wherein a compressive stress of the clad layer decreases with increasing distance from an outer surface of the clad layer within an outer portion of the clad layer; and
    wherein the compressive stress of the clad layer remains substantially constant with increasing distance from the outer surface of the clad layer within an intermediate portion of the clad layer disposed between the outer portion of the clad layer and the core layer, and a thickness of the intermediate portion of the clad layer is at least 92% of a thickness of the clad layer.

2. The laminated glass article of claim 1, wherein the outer portion of the clad layer comprises a surface ion exchanged region of the clad layer.

3. The laminated glass article of claim 1, wherein a stress profile of the clad layer within the outer portion of the clad layer comprises an error function.

4. The glass article of claim 1, wherein the compressive stress of the clad layer at the outer surface of the clad layer is from about 400 MPa to about 1000 MPa.

5. The glass article of claim 1, wherein the compressive stress of the clad layer within the intermediate portion of the clad layer is from about 50 MPa to about 450 MPa.

6. The glass article of claim 1, wherein a thickness of the outer portion of the clad layer is from about 10 µm to about 50 µm.

7. The glass article of claim 1, wherein the compressive stress of the clad layer increases with increasing distance from the outer surface of the clad layer within an inner portion of the clad layer disposed between the intermediate portion of the clad layer and the core layer.

8. The laminated glass article of claim 7, wherein the inner portion of the clad layer comprises an interface ion exchanged region of the clad layer.

9. The glass article of claim 1, wherein the average core CTE is at least about $10^{-7}/°$ C. higher than the average clad CTE.

10. The glass article of claim 1, wherein the clad layer comprises a first clad layer and a second clad layer, and the core layer is disposed between the first clad layer and the second clad layer.

11. A consumer electronic device, an architectural panel, or an automotive window comprising the glass article of claim 1.

12. The laminated glass article of claim 1, wherein a slope of the compressive stress as a function of depth within the intermediate portion is between −7 MPa/µm and 7 MPa/µm.

13. A glass article comprising;
a tensile region; and
a compressive region comprising an inner surface directly adjacent to the tensile region and an outer surface opposite the inner surface, an outer portion of the compressive region extending from the outer surface of the compressive region inward toward the tensile region to an outer depth of layer (DOL), an intermediate portion of the compressive region extending from the outer DOL inward toward the tensile region to an intermediate DOL;
wherein a compressive stress profile of the compressive region comprises a first compressive stress $CS_1$ and a second compressive stress $CS_2$ that is less than $CS_1$, a compressive stress of the outer portion is $CS_1$ at the outer surface and $CS_2$ at the outer DOL, and a compressive stress of the intermediate portion is substantially constant at $CS_2$; and
wherein the outer DOL is at most 8% of a thickness of the compressive region.

14. The glass article of claim 13, wherein the outer portion of the compressive region comprises a surface ion exchanged region.

15. The laminated glass article of claim 13, wherein a distance between the outer DOL and the intermediate DOL is at least 82% of a thickness of the compressive region.

16. The glass article of claim 13, wherein $CS_1$ is from about 400 MPa to about 1000 MPa.

17. The glass article of claim 13, further comprising an inner portion of the compressive region extending from the intermediate DOL inward toward the tensile region to an inner DOL;
wherein the compressive stress profile of the compressive region comprises a third compressive stress $CS_3$ that is between $CS_2$ and $CS_1$, and a compressive stress of the inner portion is $CS_2$ at the intermediate DOL and $CS_3$ at the inner DOL.

18. The glass article of claim 17, wherein the inner portion of the compressive region comprises an interface ion exchanged region.

19. The glass article of claim 13, wherein the tensile region comprises a core layer comprises a core glass composition, and the compressive region comprises a clad layer comprising a clad glass composition that is different than the core glass composition.

* * * * *